Feb. 4, 1964
G. E. PARDONNET
3,120,317
BOAT TRAILER
Filed Sept. 18, 1961
2 Sheets-Sheet 2
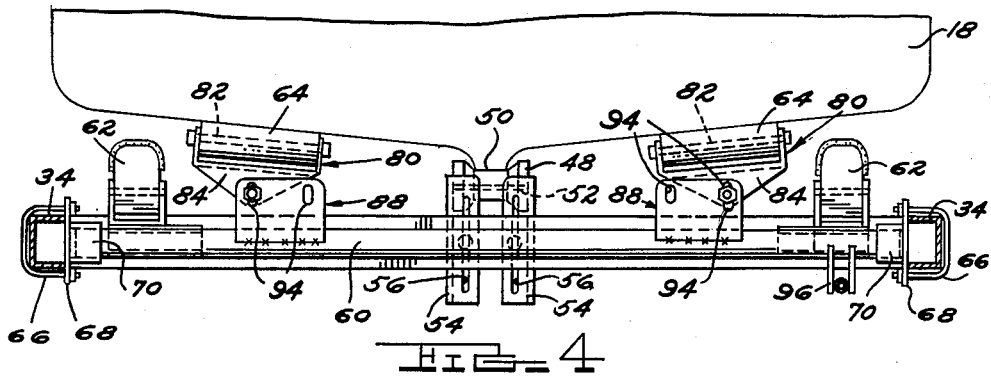
FIG. 4
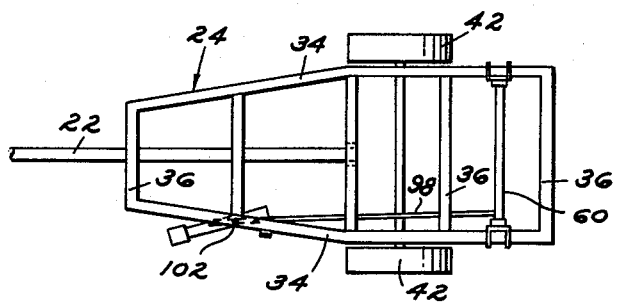
FIG. 5
FIG. 6
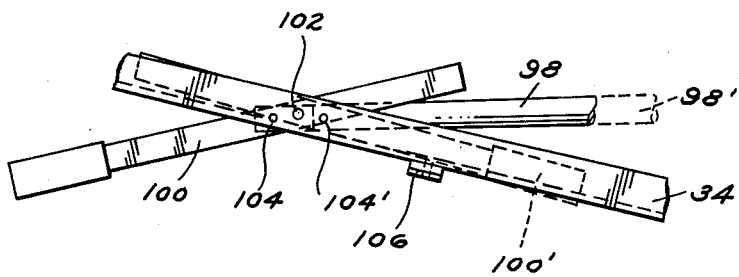
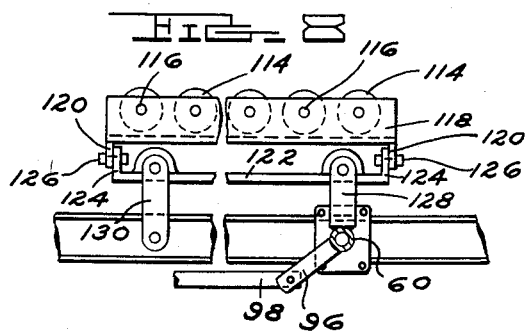
FIG. 8
INVENTOR.
GEORGE E. PARDONNET
BY
*Burton & Parker*
ATTORNEYS United States Patent Office 3,120,317
Patented Feb. 4, 1964

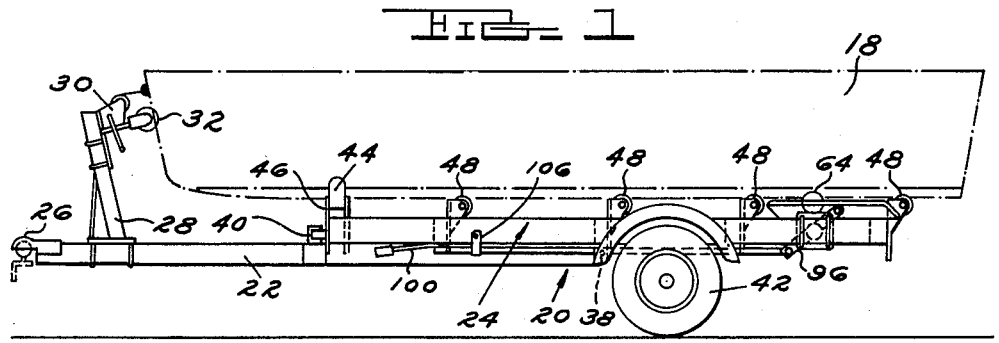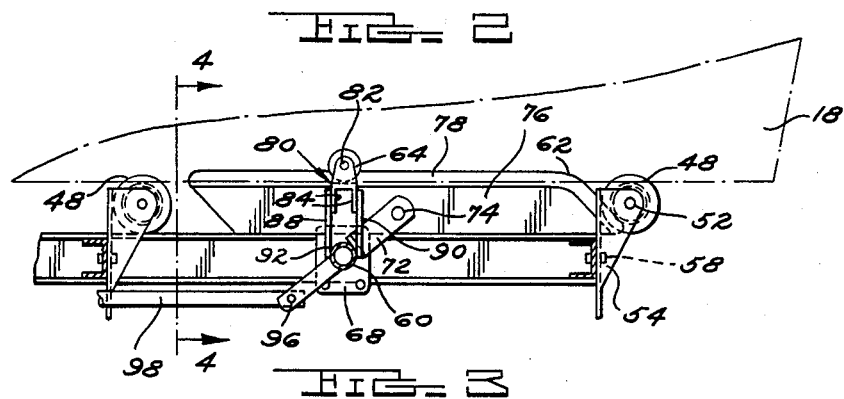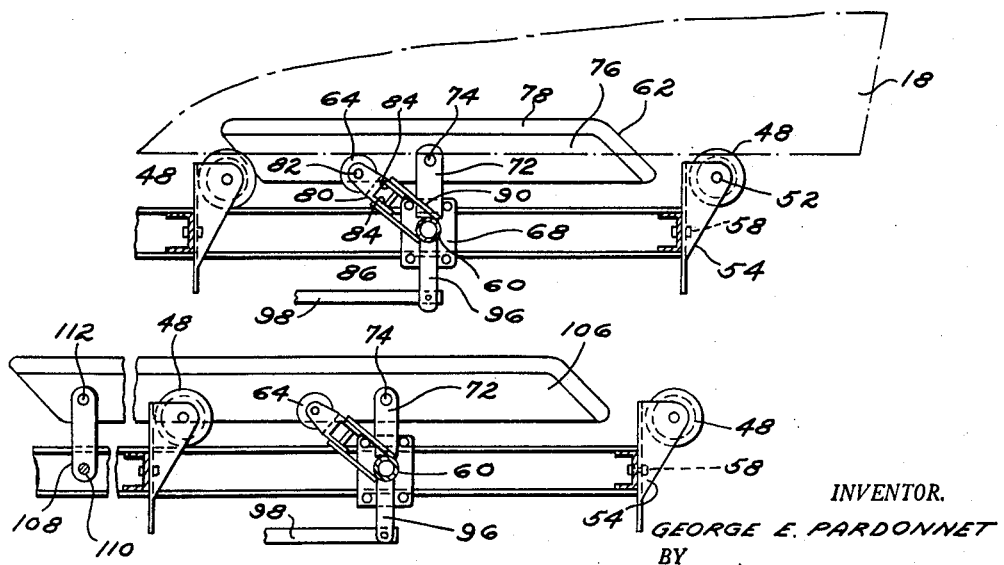

3,120,317
BOAT TRAILER
George E. Pardonnet, 17320 Delaware, Redford, Mich.
Filed Sept. 18, 1961, Ser. No. 138,787
4 Claims. (Cl. 214—512)

This invention relates to trailers, and in particular to trailers for transporting boats, which trailers have improved mechanism for loading and launching boats.

An object of the invention is the provision of a trailer for carrying boats, which trailer is provided at the rear end thereof with easily operable mechanism for facilitating the loading and launching of a boat, and for insuring safe transportation of the boat carried on the trailer.

A further object of the invention is the provision of keel rollers and adjustable bottom rollers over which the boat will easily pass during loading and launching operations, together with cradling bunks which stabilize and support the boat during transportation thereof.

Another object of the invention is the provision of bottom rollers and cradling bunks in a boat trailer, wherein the bottom rollers are raisable into hull engaging position during loading and unloading of the boat, and wherein the cradling bunks are alternatively raisable into hull engaging position during transportation of the boat.

A specific object of the invention is the provision in a boat trailer of an improved boat supporting mechanism which includes cradling bunks and bottom rollers wherein the bunks and rollers are conjointly and alternatively raisable and lowerable through manually operated linkage to facilitate loading, launching and transporting of a boat. During the loading and unloading of the boat, the mechanism is operated to raise the rollers and lower the bunks, so that the bottom of the boat may be easily rolled over the rollers. When the boat is positioned on the trailer for transportation the bunks are raised and the rollers lowered. In this position the bunks engage the boat bottom, stabilizing and supporting the boat.

A feature of the bottom rollers is that they are manually adjustable to fit any boat. Depending on the size of the boat and the hull configuration, these rollers may be adjusted toward or away from the keel, and may be also tilted so that the entire length of the roller contacts the boat hull. When correctly adjusted, the rollers may be locked in position, obviating the necessity of readjustment every time the trailer is used.

Further objects, advantages and meritorious features will more fully appear from the following specification, claims and attached drawings, wherein:

FIG. 1 is a side elevation of a boat trailer embodying the invention, showing a boat positioned on the trailer with the cradling bunks lowered and the bottom rollers raised preparatory to launching the boat;

FIG. 2 is a partial cross sectional view of the rear end portion of the trailer, showing the bottom rollers raised and the cradling bunks lowered for loading or launching a boat;

FIG. 3 is a partial cross sectional view similar to FIG. 2 showing the bottom rollers lowered and the cradling bunks raised for boat transportation;

FIG. 4 is a cross sectional view taken along line 4—4 of FIG. 2, showing the relation of keel rollers, bottom rollers and cradling bunks;

FIG. 5 is a schematic diagram of the trailer frame and the linkage for positioning the bottom rollers and cradling bunks;

FIG. 6 is an enlarged top view of a portion of the linkage of FIG. 5, showing the operation of the hand lever;

FIG. 7 is a partial cross sectional view similar to FIG. 3, showing a modified form of cradling bunk; and FIG. 8 is a partial cross sectional view showing a modified form of bottom roller construction.

Referring to the drawings there is shown a boat trailer embodying the invention with a boat 18 supported thereon. The trailer 20 generally comprises a tongue 22 and a frame 24. At the extreme forward end of the tongue 22 is provided a conventional trailer hitch 26 for attachment to an automotive vehicle for towing the trailer. Supported near the forward end of the tongue 22 on a support member 28 are a winch and cable assembly 30 for pulling the boat onto the trailer, and a bow roller 32 which serves as a stop against which the bow of the boat rests during transportation.

The trailer frame 24, shown schematically in FIG. 5, is of the type generally referred to as an A frame, having longitudinally extending side members 34 and cross braces 36. The frame 24 and tongue 22 are pivotally connected together at 38 (see FIG. 1), with the tongue underlying the frame forwardly of the pivot joint. A safety latch 40 at the extreme forward end of the frame 24 couples the frame to the tongue during transportation of the boat 18. For loading or launching of the boat, the latch 40 is released, permitting tilting of the frame 24 to an inclined position. Thus the trailer hitch 26 need never be uncoupled from the towing vehicle during loading and launching. A pair of conventional road wheels 42 support the trailer for movement behind a towing vehicle.

At the front end of the frame 24 are provided a pair of transversely extending cradle members 44, one of which is visible in FIG. 1. These members are pivotally mounted in respective brackets 46 which are secured to the frame 24. During loading and launching, the members 44 guide the bow of the boat, and with the boat 18 positioned on the trailer 20, they help to support the boat resting on the keel rollers as hereinafter described.

Spaced along the longitudinal center line of the frame 24 are keel rollers 48 along which the keel 50 of the boat 18 rides during loading and launching. When the boat 18 is fully loaded on the trailer 20, these keel rollers 48 carry most of the weight of the boat. As shown most clearly in FIG. 4, the keel rollers 48 are rotatably supported on pins 52 which are journalled in brackets 54. The brackets 54 are provided with vertical slots 56. Bolts and nuts 58 secure the brackets 54 to respective cross braces 36, and the brackets may be adjustably positioned to support a particular boat by means of the slots 56.

At the rearward end of the frame 24 is a transversely extending support member 60, upon which are mounted a pair of cradling bunks 62 and a pair of bottom rollers 64. Secured to each side member 34 by means of U-bolts 66 is a plate-like member 68 having a projecting bearing portion 70. The support member 60 is preferably of circular cross section and has opposite ends slidably received within portions 70 of plates 68, so that the member 60 is rotatable about its longitudinal center line.

The cradling bunks 62 serve to support the boat 18 during transportation, and are shown in detail in FIGS. 2, 3 and 4. Each bunk 62 is positioned closely adjacent a respective side member 34. U-shaped brackets 72 are secured to the support member 60 and support the cradling bunks between upstanding arms on pin 74. The bunks 62 are preferably made of a hard core or body 76, which may be wood or metal, and a covering 78 of a soft material which may be secured in any convenient manner to the body 76. The covering 78 prevents damage to the boat hull during transportation.

The bottom roller 64 support the boat hull during loading and launching. Each roller 64 is rotatably supported in a U-shaped bracket 80 on an axle 82. The bracket 80 has downwardly projecting skirt portions 84 which are secured by bolt and nut means 86 to member 88. The two upstanding arms 90 and 92 of member 88 are welded to the support member 60 and embrace the portions 84 of bracket 80. The rollers 64 may be vertically, horizontally and tiltably adjusted by positioning of the bolt and nut means 86 within the vertical slots 94 in member 88 (see FIG. 4). Once positioned to support a particular boat hull, the rollers 64 may be locked in position by tightening bolt and nut means 86.

As shown in FIGS. 2 and 3, the brackets 72 which support the cradling bunks 62 are angularly displaced from the members 88 which support the bottom rollers 64 on support member 60. Thus, as the support member 60 is rotated on its axis, as more fully described hereinafter, the rollers 64 are raised while the bunks 62 are lowered, as shown in FIG. 2, or alternatively, the bunks 62 are raised while the rollers 64 are lowered, as shown in FIG. 3.

Linkage connected to the support member 60 for raising and lowering the bunks 62 and rollers 64 is shown schematically in FIG. 5. Particularly the linkage comprises a lever 96 projecting laterally from member 60 (see FIGS. 2 and 3), which lever is pivotally connected at its outer end with a rod 98 extending forwardly along the frame. An arm 100 is pivotally mounted under the frame side member 34 on pin 102, and the arm 100 and rod 98 are pivotally connected as at 104, shown most clearly in FIG. 6. The arm 100 is swingable about pivot 102 from the position shown in solid outline at 100 to the position shown in dotted outline at 100′ (FIG. 6). With the arm in its forward position, shown at 100, rod 98 is pulled forwardly, as indicated at 98, and the pivotal connection is at 104. In this position the lever 96 is positioned as shown in FIG. 2, and the bottom rollers 64 are raised while the bunks 62 are lowered. When the arm is swung to the position indicated at 100′, the pivot connection is at 104′, and the rod is pushed rearwardly to the position indicated by dotted outline at 98′. Thus the lever 96 and its connected mechanism is as shown in FIG. 3, with the cradling bunks 62 raised and the bottom rollers 64 lowered. A catch 106 may be conveniently mounted on side member 34 to engage arm 100 and releasably hold it in the desired position, as shown in FIG. 6. Thus by simple manipulation of arm 100 the boat supporting bunks and rollers may be alternatively positioned.

In transporting the boat 18 positioned on the trailer 20 as shown in FIG. 1, the bow of the boat lies against roller 32, with the pulley and cable assembly locked in a position keeping the cable taut. The keel 50 of the boat rests on the keel rollers 48, which support most of the weight of the boat 18. With the boat on the trailer, arm 100 is swung to its rearward position (100′), which lowers the bottom rollers 64 and raises the cradling bunks 62 as shown in FIG. 3. As the bunks 62 are raised they engage the hull of the boat 18 and prevent it from rocking or tipping during travel. In addition, the bunks may support up to about 20 percent of the weight of the boat, while the remainder of the weight is supported on the keel rollers 48.

When it is desired to load or launch the boat 18, the arm 100 is released from catch 106 and moved to its forward position, lowering cradling bunks 62 and raising the bottom rollers 64, as shown in FIG. 2. Safety latch 40 is released, permitting the rear end of the trailer to be inclined downwardly, and the boat is eased on or off the trailer by the winch and cable assembly 30. As the boat moves longitudinally of the trailer the keel rolls on keel rollers 48 and the hull rolls over the bottom rollers 64. In loading and launching, the bottom rollers 64 prevent the boat 18 from rocking or tipping, and also present low friction surfaces over which the boat hull travels. During the loading and launching operations, the bottom rollers 64 will support approximately 20 percent of the weight of the boat, while the keel rollers 48 carry the remaining weight.

In FIG. 7 is shown a modified form of cradling bunk designated by the numeral 107. The cradling bunk 107 is of a construction similar to that of the cradling bunk 62 shown in FIG. 3 and described hereinabove. In providing a boat trailer for transporting boats the amount of support that must be provided by the cradling bunk along the hull of the boat is to a great extent dependent on the dimension of the boat and the weight to be supported on the bunk. Therefore, in a trailer designed to carry larger boats, say 18 feet long or over, the cradling bunk, such as shown at 107 in FIG. 7, must be of a length sufficient to give adequate support to the bottom of the boat during transportation thereof upon the trailer. The construction of those portions of the boat trailer shown in FIG. 7, such as the keel rollers 48, the bottom roller 64, and the linkage for raising and lowering the bunks and the rollers, are identical to that hereinabove shown and described.

The cradling bunk 107 is supported at its rearward end in exactly the same manner as the cradling bunk 62 shown in FIG. 3. Bunk 107 is, however, of substantially greater length than cradling bunk 62. The forward end of the cradling bunk 107 is supported by means of a link 108 which is pivotally secured to the frame at its lower end by means of a pin 110. The upper end of the link 108 is similarly pivotally secured to the bunk 107 by means of the pin 112. The bottom roller 64 is secured to the support member 60 in substantially the same manner as the bottom roller shown in FIG. 3. The cradling bunk 107 is raised and lowered by the manipulation of the linkage in exactly the same manner as the cradling bunk 62. The only structural difference between the cradling bunk 62 and 107 is that the latter is substantially longer and has a support at the forward end thereof to assure its stability during use.

FIG. 8 shows a modified form of bottom roller construction wherein a plurality of rollers 114 are pivotally mounted on respective shafts or pins 116 to provide additional support for a boat being loaded or launched from the trailer. The rollers 114 are supported for rotation in a channel member 118 with the shafts or pins 116 having opposite ends journalled within the channel. At either end of the channel 118 are provided depending ear portions 120. The support member 122 extends longitudinally beneath the rollers and has upstanding portions 124 thereon which are connected respectively to the depending ear portions 120 by means of nuts and bolts 126. Upon loosening of the bolts 126, the channel member supporting the rollers 114 may be rotated about the axis of the bolts. Thus the bottom rollers 114 may be so inclined relative to the frame of the trailer so as to engage the hull of the boat being loaded or launched. A U-shaped bracket 128 secured to the support member 60 as by welding and pivotally connected at its upper end to the member 122 serves to connect the rollers to the members 60. Similarly the forward end of the group of rollers is supported by a link 130 which is pivotally supported to the frame at its lower end and pivotally connected to the member 122 at its upper end. Thus upon actuation of the linkage mechanism hereinbefore shown and described the group of rollers 114 may be raised and lowered.

As will be obvious to any one skilled in the art, either of the cradling bunks 62 and 107 could be used in combination with either construction of bottom rollers shown at 64 or 114. The choice of the size cradling bunks and the number of bottom rollers would be dependent upon the size and weight of the boat desired to be transported.

What is claimed is:

1. In a boat trailer having a frame with a pair of road wheels supporting the frame and a trailer hitch at the forward end of the frame for coupling the trailer to an automotive vehicle, boat supporting means on the frame comprising: keel rollers disposed at the longitudinal center line of the frame for guiding and supporting the keel of a boat, one of said keel rollers disposed at the extreme rear end of said frame, a support member extending transversely of said frame spaced forwardly of said rear keel roller and having end portions journalled in opposite sides of the frame, cradling bunks mounted on said support member adjacent opposite ends thereof and extending longitudinally of the frame to support the hull of a boat resting upon the keel rollers, said bunks being pivotable about axes extending transversely of the frame, bottom rollers mounted in spaced apart relation on said support member on opposite sides of the longitudinal center line of the frame with the axes of rotation of said bottom rollers disposed substantially normal to said center line of the frame, said bottom rollers being angularly displaced on said support member relative to said cradling bunks, and actuating means connected to said support member for rotating the support member to selectively position either said cradling bunks or said bottom rollers uppermost with respect to said trailer frame.

2. The invention as defined in claim 1 characterized in that said actuating means comprises an elongate arm pivotally connected to said support member and extending generally longitudinally of the frame to a point adjacent the forward end thereof, and a handle pivotally connected to said trailer frame and to said arm at spaced apart points along the handle for swingable movement about its connection with the frame to reciprocate said arm, and thereby rotate said support member.

3. In a boat trailer having a frame with a pair of road wheels supporting the frame, boat supporting means on the frame comprising: a plurality of keel rollers disposed in spaced apart relation along the longitudinal center line of the frame for guiding and supporting the keel of a boat, a support member extending transversely of said longitudinal center line of the frame and having opposite end portions journaled in respective opposite sides of the frame, a first pair of brackets rigidly secured to said support member adjacent opposite ends thereof, an elongate longitudinally extending cradling bunk supported in each of said first pair of brackets for limited rockable movement about a horizontal axis, a second pair of brackets rigidly secured to said support member on opposite sides of the longitudinal center line of the frame and spaced respectively from said first pair of brackets, a bottom roller rotatably mounted in each of said second brackets, said first and second pair of brackets being secured to said support member in angularly spaced apart relation, and mechanical linkage means connected to said support member for rotating the member through a predetermined arc to selectively position either said cradling bunks on said bottom rollers uppermost with respect to said frame.

4. In a boat trailer having a frame with a pair of road wheels supporting the frame, boat supporting means on the frame comprising: a plurality of keel rollers mounted in spaced apart relation along the longitudinal center line of the frame; a support member extending generally transversely of the center line of the frame and having its opposite ends journaled for rotation in the frame side members; a pair of upstanding U-shaped brackets rigidly secured at their bases to said supporting member adjacent opposite ends thereof; an elongate cradling bunk positioned within the bight of each of said U-shaped brackets with each of said bunks extending longitudinally of the frame center line and being pivotally supported intermediate its opposite ends in its respective bracket on an axis extending substantially transversely of the bunk; a second pair of brackets rigidly secured to said support member in spaced apart relation intermediate said U-shaped brackets; a bottom roller mounted in each of said second brackets, with each roller being both vertically and tiltably adjustable within its respective bracket to be positioned to engage the hull of a boat along its entire length; means for locking each bottom roller in a preselected position for adjustment; said U-shaped pair of brackets being angularly displaced on said support member with respect to said second pair of brackets; and actuating means coupled to said support member for rotating the member between selected positions of rotation to position either said cradling bunks or said bottom rollers uppermost with respect to said trailer frame.

References Cited in the file of this patent

UNITED STATES PATENTS

| 2,805,786 | Green | Sept. 10, 1957 |
| 2,808,953 | Whitney | Oct. 8, 1957 |
| 2,975,916 | Steber | Mar. 21, 1961 |